(12) United States Patent
Macchieraldo et al.

(10) Patent No.: US 10,591,374 B2
(45) Date of Patent: Mar. 17, 2020

(54) FORCE MEASURING DEVICE FOR A SYSTEM FOR CRIMPING AN ELEMENT ON A PART

(71) Applicant: BOLLHOFF OTALU S.A., La Ravoire (FR)

(72) Inventors: David Macchieraldo, Traize (FR); Jordi Gargallo, Barberaz (FR); Claude Mattler, Mouxy (FR)

(73) Assignee: BOLLHOFF OTALU S.A., La Ravoire (FR)

( * ) Notice: Subject to any disclaimer, the term of this patent is extended or adjusted under 35 U.S.C. 154(b) by 22 days.

(21) Appl. No.: 15/573,086

(22) PCT Filed: May 18, 2016

(86) PCT No.: PCT/FR2016/051166
§ 371 (c)(1),
(2) Date: Nov. 9, 2017

(87) PCT Pub. No.: WO2016/185134
PCT Pub. Date: Nov. 24, 2016

(65) Prior Publication Data
US 2018/0136061 A1    May 17, 2018

(30) Foreign Application Priority Data
May 18, 2015    (FR) .................................... 15 54436

(51) Int. Cl.
*G01L 7/16*    (2006.01)
*G01L 5/24*    (2006.01)
(Continued)

(52) U.S. Cl.
CPC ................ *G01L 7/166* (2013.01); *G01L 1/02* (2013.01); *G01L 5/24* (2013.01); *H01R 43/0486* (2013.01)

(58) Field of Classification Search
CPC ......................... H01R 43/0486; H01R 43/0428
See application file for complete search history.

(56) References Cited

U.S. PATENT DOCUMENTS 4,333,351 A  *  6/1982  Bickford .................. G01L 5/24
                                                        411/14
8,402,632 B2 *  3/2013  Gory ...................... B21J 15/043
                                                        29/243.521
(Continued)

FOREIGN PATENT DOCUMENTS

DE    102007050176 A1  *  4/2009
GB       1309547 A         3/1973
(Continued)

OTHER PUBLICATIONS

Nov. 21, 2017 International Preliminary Report on Patentability issued in International Patent Application No. PCT/FR2016/051166.
(Continued)

*Primary Examiner* — David A Rogers
(74) *Attorney, Agent, or Firm* — Oliff PLC

(57) ABSTRACT

A Device for measuring a force applied by a fitting apparatus provided with a threaded rod having an external or internal thread, includes a hydraulic chamber containing a fluid; a piston configured to slide inside the hydraulic chamber; a threaded connector fixed to the piston, the threaded connector having a thread configured in such a way that the threaded rod screws onto the threaded connector, so that the threaded rod can impose an axial force on the piston resulting in travel of the piston in the hydraulic chamber; and a pressure gauge communicating with the hydraulic chamber, configured to measure a pressure inside the hydraulic chamber created by the axial force applied on the piston by the threaded rod.

7 Claims, 7 Drawing Sheets

(51) Int. Cl.
*G01L 1/02* (2006.01)
*H01R 43/048* (2006.01)

(56) References Cited

U.S. PATENT DOCUMENTS

| | | | | |
|---|---|---|---|---|
| 8,583,383 B2 * | 11/2013 | Imai | ................. | G01L 5/24 |
| | | | | 702/43 |
| 2011/0184666 A1 | 7/2011 | Imai et al. | | |

FOREIGN PATENT DOCUMENTS

| | | | | |
|---|---|---|---|---|
| JP | 072583368 A | * | 10/1985 | |
| JP | 2002-267555 A | | 9/2002 | |
| JP | 2003014565 A | * | 1/2003 | |
| JP | 2004093362 A | * | 3/2004 | |

OTHER PUBLICATIONS

Jul. 28, 2016 Search Report issued in International Patent Application No. PCT/FR2016/051166.

* cited by examiner

FORCE MEASURING DEVICE FOR A SYSTEM FOR CRIMPING AN ELEMENT ON A PART

BACKGROUND OF THE INVENTION

The present invention relates to the field of crimping devices for nuts and studs to be crimped on a part, in particular crimping devices implementing fitting with force. The object of the invention is to provide a device for measuring the force applied by such crimping devices.

STATE OF THE ART

Crimping is a simple method which is widely used for assembling two parts. The crimping device for nut or stud to be crimped, or crimper, enables screwing, crimping and unscrewing operations of the nut or stud to be performed.

Certain crimpers perform crimping of nuts or studs by implementing a fitting operation with force. The value of the force to be applied is previously defined at the level of the crimper according to the application and to the part to be crimped on its support. In general manner, the force values range from 3.5 kN to 40 kN for usual cases and can exceptionally be up to 60 kN.

The force calibrated beforehand by the crimper is then applied systematically and in repeatable manner. However, the force applied by the crimper to assemble two parts has to be checked regularly and directly at the level of the crimper. This regular checking guarantees the quality of the crimping operation and makes it possible to ensure that there is no drift due to wear of certain parts and that the crimping process is repeatable, suitable and sufficient.

To check the force applied by a crimper, force measuring devices using piezoelectric cells can be used. This type of device using piezoelectric cells requires the use of amplifiers and complex electronic systems to process and transpose the piezoelectric data into a value usable by the user.

Furthermore, the force measuring means using piezoelectric cells is a very complex means, which is difficult to achieve, and is therefore a costly means in comparison with the price of a conventional crimper.

OBJECT OF THE INVENTION

A requirement exists to provide a force measuring device suitable for crimping devices by force, that is compact, mobile, and able to measure a peak force in reliable and efficient manner.

This requirement tends to be met and the above-mentioned shortcomings to be palliated by providing a device for measuring the force applied by a fitting apparatus of an element to be crimped, said apparatus being provided with a threaded rod having an internal or external thread. The device advantageously comprises:
- a hydraulic chamber comprising a fluid and extending along a longitudinal axis;
- a piston configured to slide inside the hydraulic chamber along said longitudinal axis;
- a threaded connector fixed to the piston, the threaded connector having an external or internal thread configured in such a way that the threaded rod screws onto the threaded connector so that the threaded rod can impose an axial force on the piston resulting in travel of the piston, along said longitudinal axis, inside the hydraulic chamber;
- a pressure gauge communicating with the hydraulic chamber, configured to measure a pressure inside the hydraulic chamber created by the axial force applied on the piston by the threaded rod of the fitting apparatus.

In preferential manner, the device also comprises a display connected to the pressure gauge, the display being configured to transpose the pressure measured by the pressure gauge into an axial force value.

According to a preferred embodiment, the device comprises an anvil designed to receive a counter-support of the fitting apparatus so as to secure the fitting apparatus on the device by screwing the threaded rod onto the threaded connector and placing the counter-support against the anvil.

Preferentially, the piston and the hydraulic chamber are configured in such a way that the piston can have a travel along the longitudinal axis of at least 0.2 mm.

According to an alternative, the threaded connector is formed by a portion of the piston so that the threaded connector and the piston form a monoblock part.

According to an advantageous embodiment, the device is provided with a set of interchangeable parts, each part of the set being configured to form the threaded connector. In preferential manner, the set of interchangeable parts comprises parts designed to receive the threaded rod having a threadprofile chosen from: a conifer profile, a square profile, a truncated profile, a conical profile or an offset pitchs profile.

According to one embodiment, the device is provided with a rechargeable electric battery configured to supply electric power to elements of the measuring device.

According to an alternative, the piston and hydraulic chamber are arranged in such a way that the axial force imposed on the piston results in an increase of the pressure or a decrease of the pressure in the hydraulic chamber.

BRIEF DESCRIPTION OF THE DRAWINGS

Other advantages and features will become more clearly apparent from the following description of particular embodiments of the invention given for non-restrictive examples and represented in the appended drawings, in which.

DESCRIPTION OF PREFERENTIAL EMBODIMENTS OF THE INVENTION

A requirement exists to provide a force measuring device suitable for crimping devices by force, that is able to measure a peak force in reliable and efficient manner.

An already existing force measuring device using a piezoelectric cell is cumbersome and cannot be portable. Furthermore, this technical solution is not suitable for measurement of a peak force, in other words a force obtained in a very short time. The kinematics linked to crimping are in fact very rapid. The tie rod of the crimper goes from a rest state to the applied force value in less than one second. Thus, when a force is applied on a cell of indeformable force, such as a piezoelectric cell of a measuring device, a "shock" effect is applied. This "shock" effect can bias measurement of the force and impact its reliability.

To provide a reliable and precise measurement of the peak force applied by a fitting apparatus of an element to be crimped, it is advantageous to use a force measuring device suitable for this type of apparatus while at the same time being mobile, compact and easy to manufacture.

These requirements tend to be met by providing a force measuring device taking advantage of transformation of the axial force applied by the fitting apparatus into a hydraulic pressure, while at the same time enabling the fitting apparatus to perform a movement-travel when the measurement is made. A measuring device providing such a possibility of a movement-travel makes it possible to perform a measurement of the force in realistic manner under the actual operating conditions of the fitting apparatus.

Figure 1A:
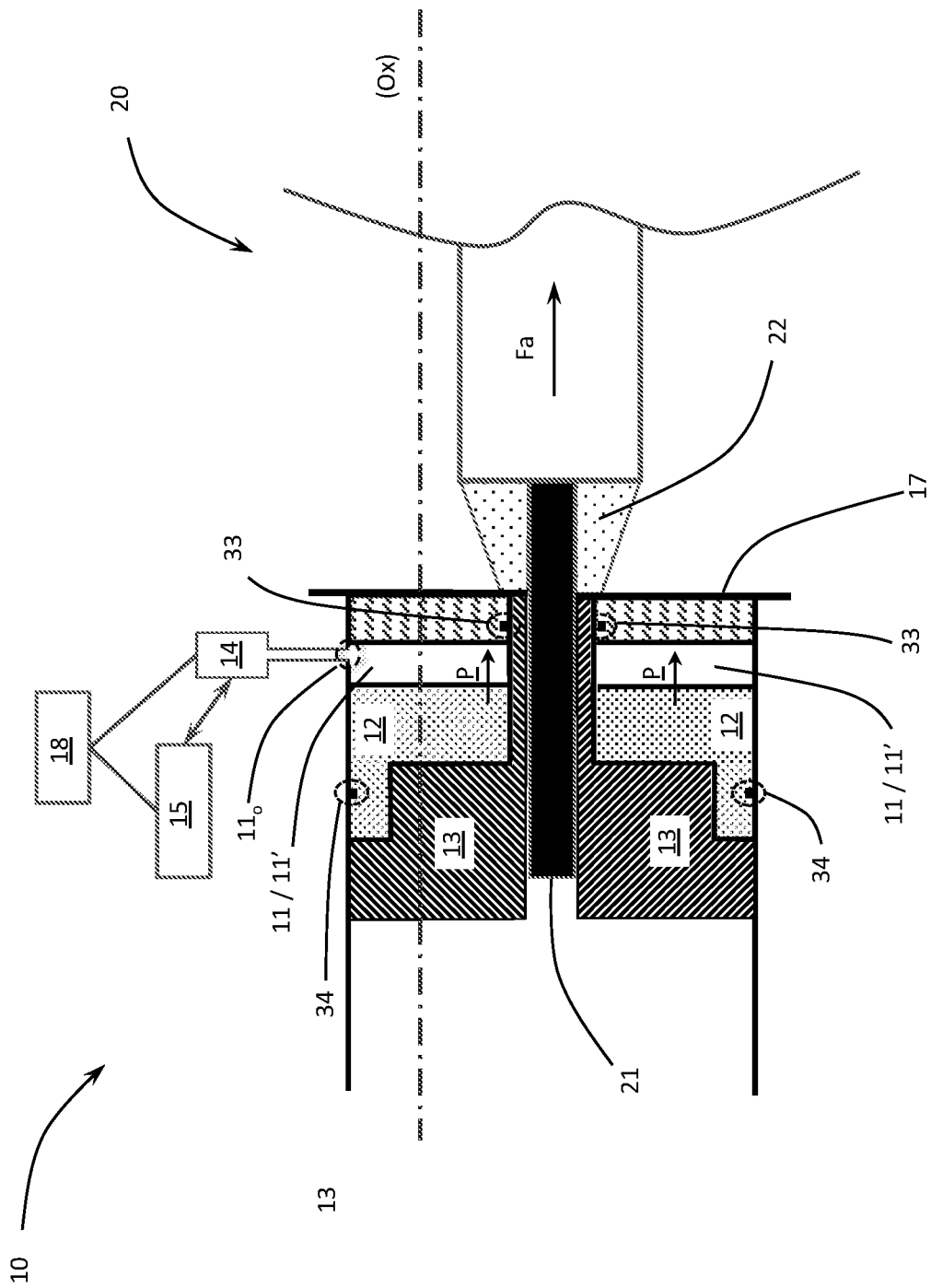
FIGS. 1A and 1B represent embodiments of a force measuring device for a system for crimping an element on a part, in schematic manner, in cross-sectional view.
Figure 1B:
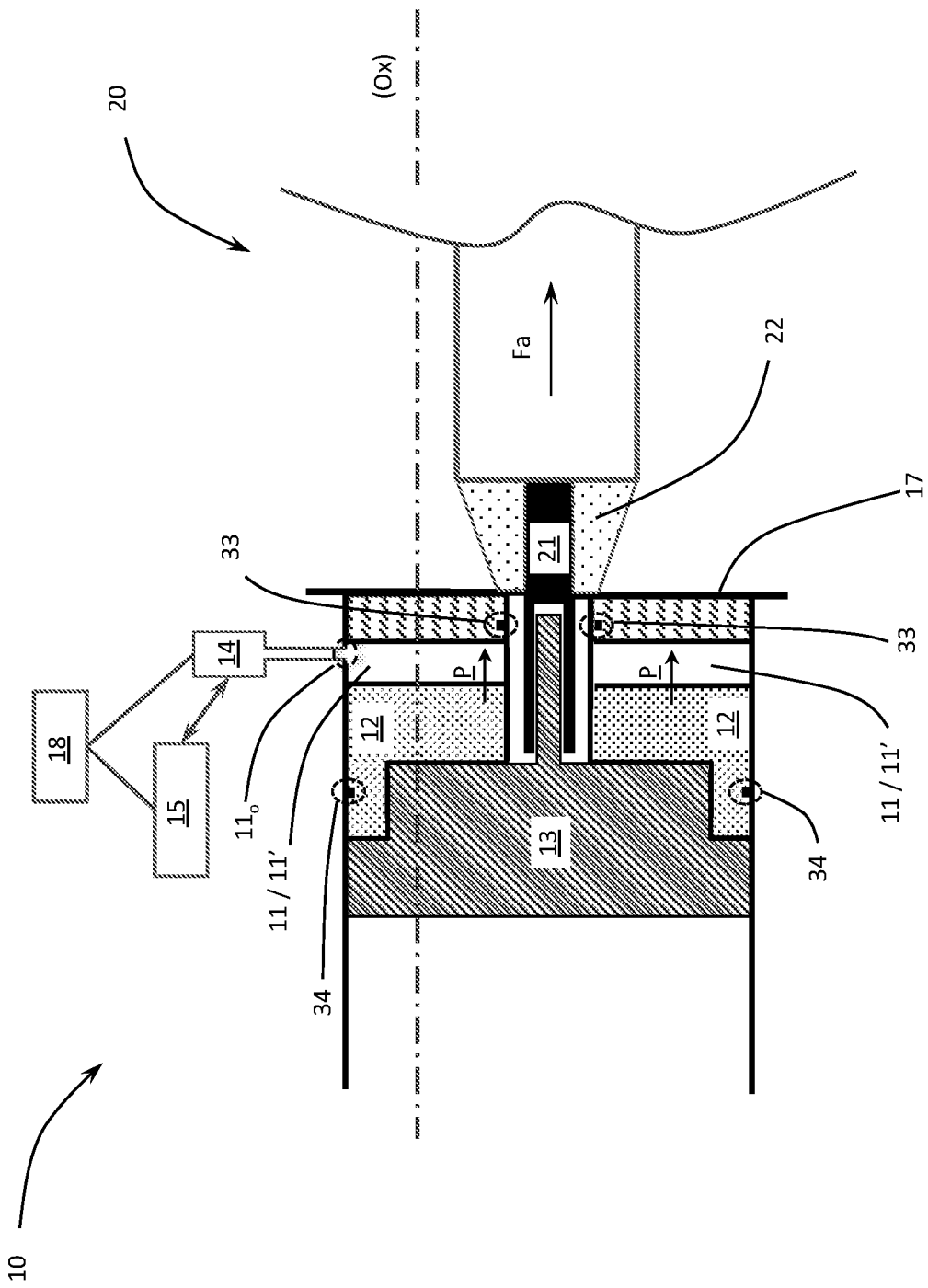

FIG. 1 illustrates in schematic manner a measuring device 10 of a force applied by a fitting apparatus 20 of an element to be crimped. The measuring device 10 is compatible with fitting apparatuses 20 provided with a threaded rod 21 having an external thread (cf. FIG. 1A), or fitting apparatuses 20 provided with a threaded rod 21 having an internal thread, in other words provided with tapped sockets (cf. FIG. 1B).

The measuring device 10 advantageously comprises a hydraulic chamber 11 operating indirectly in conjunction with the threaded rod 21 of the fitting apparatus 20 to transform the force applied by the fitting apparatus 20, via the rod 21, into a hydraulic pressure. The hydraulic chamber 11 further extends along a longitudinal axis Ox and preferentially comprises an incompressible fluid 11'.

The measuring device 10 further comprises a piston 12 configured to slide inside the hydraulic chamber 11. The sliding movement of the piston 12 inside the hydraulic chamber takes place along the longitudinal axis Ox.

The chamber 11 comprises an aperture 110 enabling a fluid, in particular the incompressible fluid 11', to be inlet and/or removed during the movement of the piston 12 in the hydraulic chamber 11. The sealing between the hydraulic chamber 11 and piston 12 is advantageously performed by seals 33 and 34 configured to enable an operation and a pressure increase inside the hydraulic chamber 11. The seals 33 and 34 further perform protection of the device 10 against the risks of pollution intrusion.

To be able to measure a force applied by the fitting apparatus 20, the measuring device 10 is provided with a means designed to secure the rod 21 of the said apparatus 20 on the device 10. The measuring device 10 thus comprises a threaded connector 13 fixed to the piston 12, in other words, securely attached to the piston 12. The connector 13 has an internal thread (tapping) or an external thread (cf. respectively FIGS. 1A and 1B), and is configured for the rod 21 to screw onto the connector 13. Preferably, the connector 13 is inserted in a hollowed-out area of the piston 12.

The connector 13 is designed to receive a rod having an external thread or a tapped socket 21 of the fitting apparatus 20. The connector 13 thus has a corresponding thread. In other words, the connector 13 can be adapted to match the different types of threads to enable simple and efficient use of the measuring device with the different fitting apparatuses.

Figure 2:
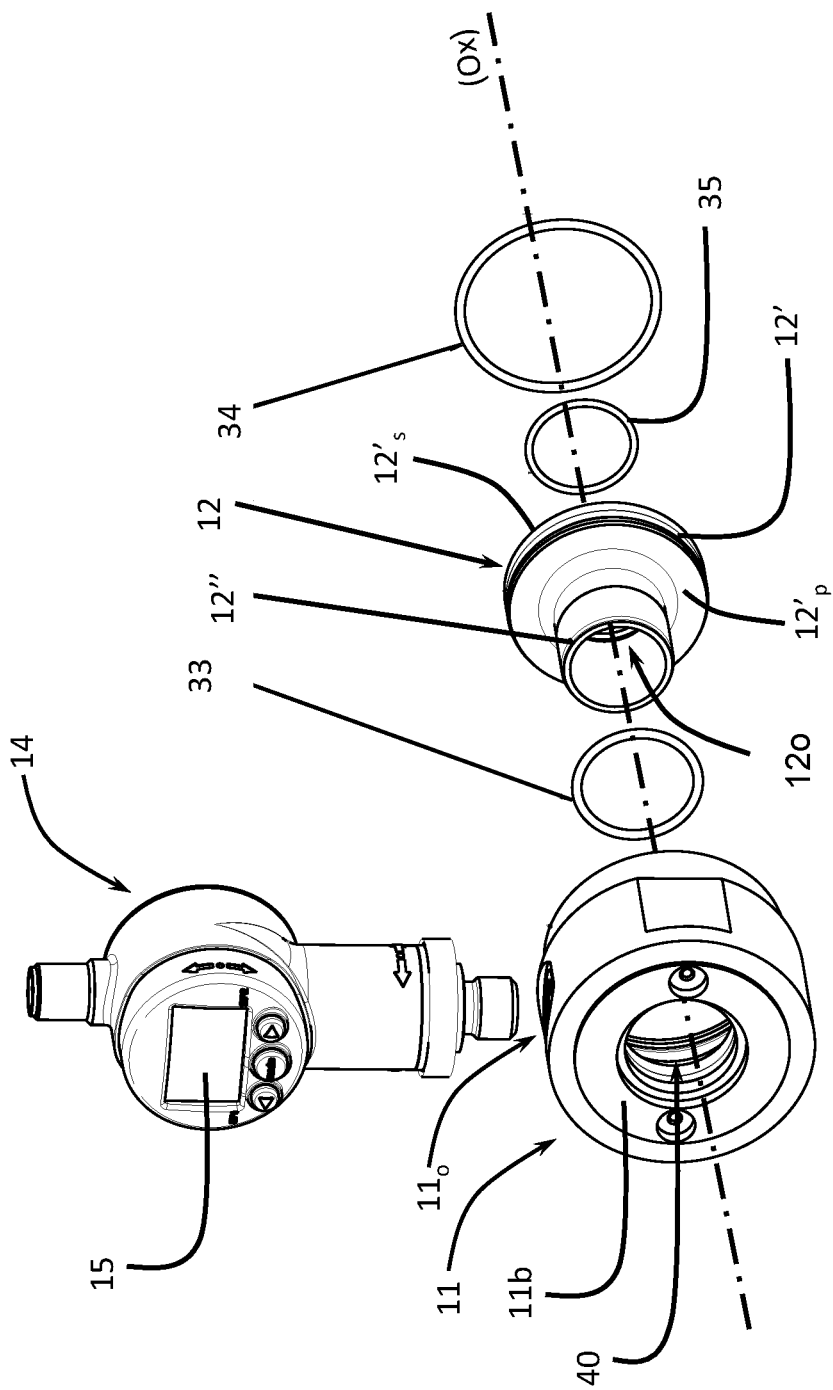
FIG. 2 represents an exemplary embodiment of the force measuring device, in exploded perspective view.

According to a preferential embodiment illustrated in FIG. 2, the hydraulic chamber 11 preferentially has the shape of a hollow cylinder having a crown 11b as its base and the longitudinal axis Ox as axis of revolution. The crown 11b can be a square or hexagonal crown, or be of any other geometric shape with a basic shape formed by two preferentially concentric contours. Here the crown 11b is a flat circular crown. The annular chamber 11 further comprises a first hole 40, preferentially cylindrically shaped in such a way that the rod 21 of the fitting apparatus 20 can enter into the hole 40.

The piston 12 comprises a first portion 12', through which an opening 12o passes, configured to be aligned with the hole 40, so that the rod 21 can enter into the opening 12o via the hole 40. The first portion 12' is dimensioned so that it slides in the chamber 11.

The first portion 12' further comprises a wall 12'p configured to be in contact with the incompressible fluid 11' in the chamber 11, and also comprises a surface 12's, opposite the wall 12'p, in the direction of the axis Ox. The surface 12's is configured so as to be preferentially, at least partially, in contact with the connector 13. According to this embodiment, the first portion 12' has the shape of a hollow cylinder.

The piston 12 further comprises a second portion 12" delineating the opening 12o and preferentially having the shape of a hollow cylinder the axis of revolution of which is the longitudinal axis Ox. The second portion 12" is configured so as to slide in the cylindrical hole 40. The first and second portions 12' and 12" are secured to one another and are arranged in such a way that the first portion 12' forms a shoulder and a base for the second portion 12".

The device 10 also comprises a set of seals, in particular the seals 33, 34 and the O-ring 35 fitted between the portions of the piston 12' and 12" firstly and the hydraulic chamber 11, so that the piston 12 can slide in tight manner in the annular chamber 11.

The connector 13 is configured so as to be fixed to the piston 12, preferentially at the level of the surface 12's and/or at the level of the second portion 12", for example in the opening 12o. In preferential manner, the connector 13 comprises a base 13' and a longitudinal portion 13" (cf. FIGS. 3A and 3B). The base 13' and the longitudinal portion 13" are secured to one another. The elements 13' 13" can be joined by a shoulder or, in preferential manner, by a chamfer 13'c (cf. FIGS. 3A and 3B).

The longitudinal portion 13" is configured so as to be able to be located in the opening 12o and therefore also in the hole 40. The chamfer 13c is configured to come up against the stop formed by the surface 12s.

Figure 3A:
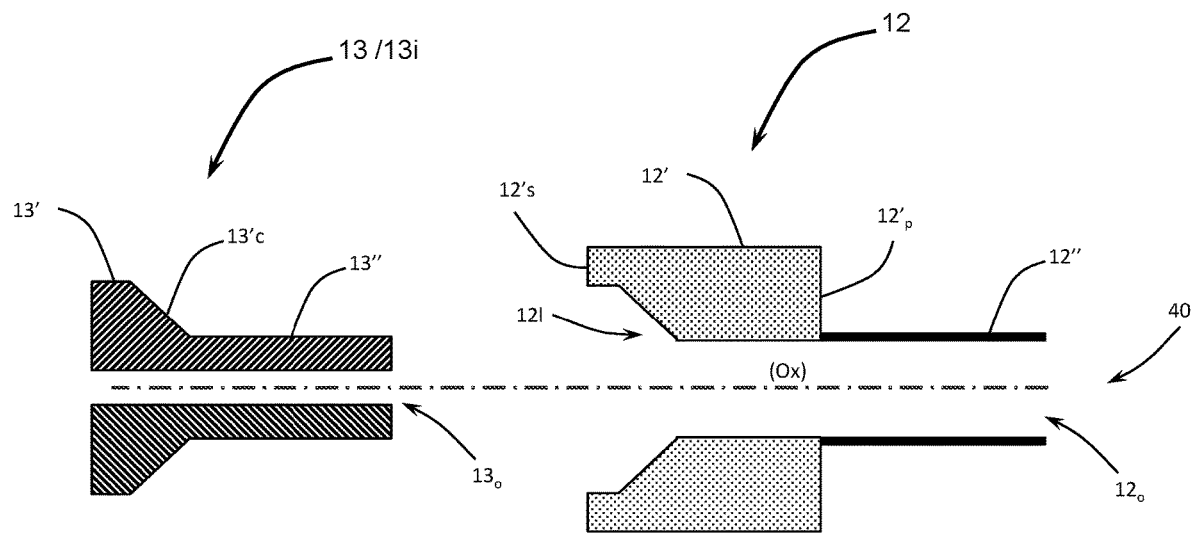
FIGS. 3A and 3B represent an embodiment of the connector and of the piston of the force measuring device, in schematic manner, in cross-sectional view.

According to an embodiment illustrated in FIG. 3A, the longitudinal portion 13" comprises a second hole 13o, which can be pass-through or blind, comprising the internal thread of the connector 13. The second hole 13o extends along the longitudinal axis Ox. The connector 13 is then configured so that a rod 21 having an external thread can be screwed onto the connector 13.

Figure 3B:
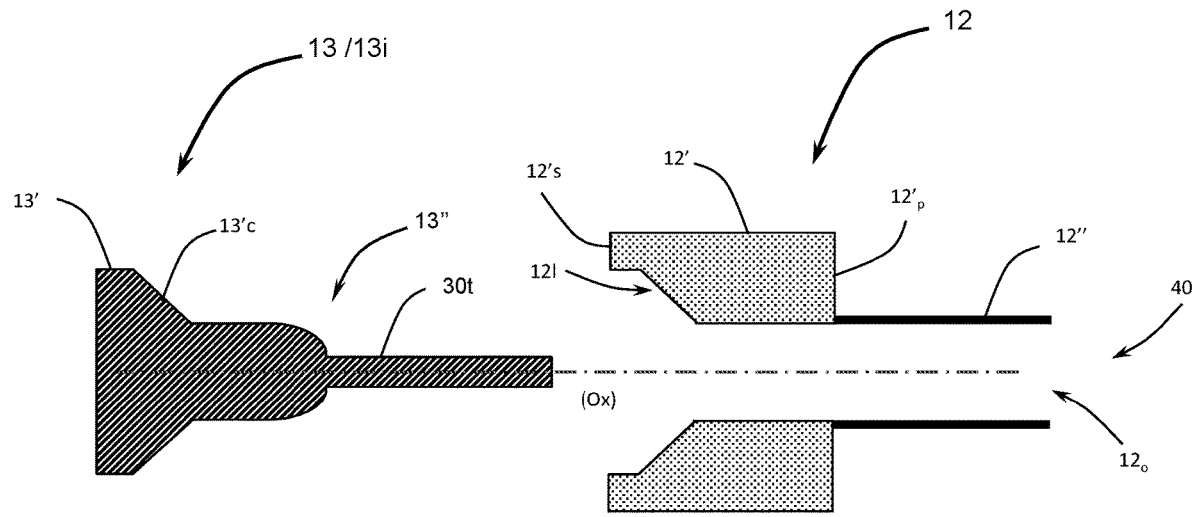

According to another embodiment illustrated in FIG. 3B, the longitudinal portion 13" comprises a rod 30t located at the opposite end to the base 13'. The rod 30t has an external thread, in other words the external thread of the connector 13. The connector 13 is then configured so that a rod 21 having an internal thread, in other words a tapping, can be screwed onto the connector 13.

The connector 13 can be fixed by any known means to the piston 12, for example by clip-fastening, by screwing etc. Preferentially, the piston 12 comprises a housing 12l at the level of the surface 12's configured to accommodate the base 13' of the connector 13 (cf. FIGS. 3A and 3B).

According to a preferential embodiment, the force measuring device 10 comprises a set of interchangeable parts 13$i$, each part 13$i$ of the set being configured to form the threaded connector 13 (cf. FIGS. 3A and 3B). The set can comprise parts 13$i$ designed to cooperate with the threaded rod 21 having a specific type of thread with specific dimensions. Preferentially, the parts 13$i$ are configured to cooperate with threaded rods 21 having a non-standardized internal or external thread, or a standardized thread with a metric thread comprised between M3 and M16.

The set of parts 13$i$ further advantageously comprises parts designed to receive threaded rods 21 having a thread with a profile chosen from a non-exhaustive list comprising: a conifer profile, a square profile, a truncated profile, a conical profile, and a offset pitchs profile.

In other words, the set of parts 13$i$ comprises as many (threaded or tapped) parts as versions of rods 21 of the fitting apparatus 20, of different dimensions and/or of different shapes.

The device 10 can advantageously be used for different crimpers 20, in other words, the measuring device does not require any special adjustment of the tie rod and anvil of the crimper 20. The measuring device 10 advantageously enables a quick measurement so as not to disturb the efficient performance of the crimping operations, in particular those performed on an assembly line.

Figure 4A:
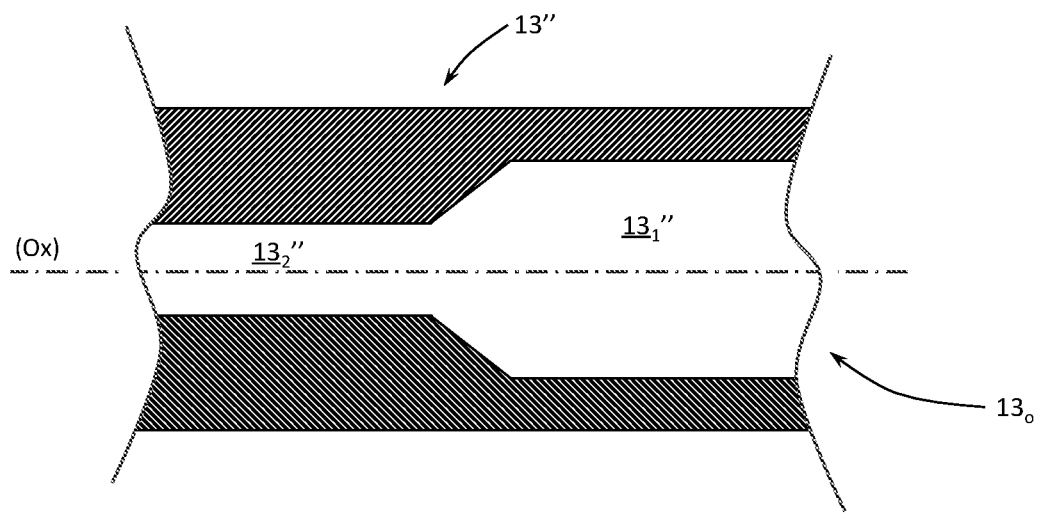
FIGS. 4A and 4B represent embodiments of the connector of the force measuring device, in schematic manner, in cross-sectional view.
Figure 4B:
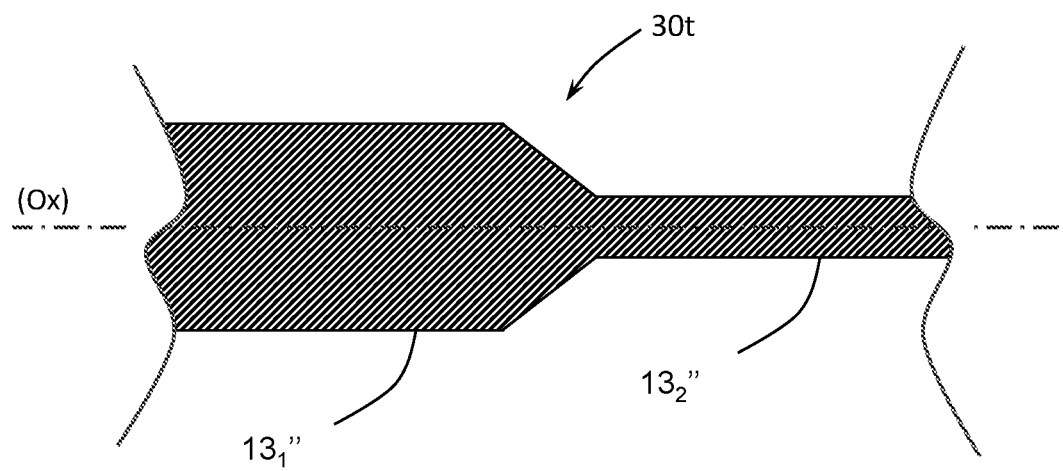

According to a particular embodiment represented in FIGS. 4A and 4B, the longitudinal portion 13" of the connector 13 advantageously comprises at least two successive stages $13_1$" and $13_2$" the transverse dimensions of which are decreasing when going from one stage to the next, in a predefined direction and in the direction of the longitudinal axis Ox.

According to a first exemplary embodiment illustrated in FIG. 4A, the connector 13 is a tapped connector configured to cooperate with a rod 21 having an external thread. The second hole 13$o$ of the tapped connector 13 comprises at least two tapped stages $13_1$" and $13_2$" having transverse cross-sections and metric threads decreasing in a predefined direction corresponding to the direction of insertion of the threaded rod 21 into the measuring device 10. For example purposes, the first stage $13_1$" has a tapping adapted for the metric thread M16 and the second stage $13_2$" has a tapping adapted for the metric thread M14.

According to a second exemplary embodiment illustrated in FIG. 4B, the connector 13 is a connector having an external thread configured to cooperate with a rod 21 having an internal thread, in other words a tapped rod. The rod 30$t$ of the connector 13 comprises at least two threaded stages $13_1$" and $13_2$" having decreasing transverse cross-sections, in other words decreasing metric threads in a predefined direction corresponding to the opposite direction to the direction of insertion of the threaded rod 21 into the measuring device 10. For example purposes, the first stage $13_1$" has a metric thread M16 and the second stage $13_2$" has a metric thread M14.

According to a third exemplary embodiment (not represented), the connector 13 comprises a rod 30$t$ having both an external thread and an internal thread.

A range can thus advantageously be provided comprising two, three or more stagings of the connector 13 so that they can be used with a variety of rods 21 having different transverse dimensions. This avoids having to change connectors 13, between two measurements concerning fitting apparatuses having rods 21 with different transverse dimensions, within the limit of the admissible and consistent geometries and lengths of said threaded rods 21.

According to an alternative, the piston 12 comprises a portion (the connector 13) having an internal or external thread configured so that a rod 21 of the fitting apparatus 20 is screwed directly onto the piston 12. Said portion acting as connector 13 connecting the rod 21 mechanically with the piston 12. In other words, the connector 13 is formed by a portion of the piston 12 so that the connector 13 and piston 12 form a monoblock part.

To perform a measurement of the force applied by the fitting apparatus 20, the latter is secured to the measuring device 10 by screwing the threaded rod 21 onto the threaded connector 13. In this way, when the fitting apparatus 20 applies a force, simulating a placing operation of an element to be crimped, the rod 21 imposes an axial force Fa on the connector 13, in other words on the piston 12. The axial force Fa imposed by the rod 21 then results in travel of the piston 12 along the longitudinal axis Ox in the hydraulic chamber 11.

The arrangement of the hydraulic chamber 11, piston 12, and threaded connector 13, and their cooperation with the rod 21 of a fitting apparatus 20, thereby enable an axial force Fa applied by the rod 21 to be transformed into an associated hydraulic pressure P created by the piston 12 in the hydraulic chamber 11. To quantify the force Fa applied by the fitting apparatus 20, it is therefore opportune to measure the associated pressure P.

The measuring device 10 thus advantageously comprises a pressure gauge 14 communicating with the hydraulic chamber 11. The pressure gauge 14 is configured so as to measure the pressure P inside the hydraulic chamber 11 created by the axial force Fa applied on the piston 12 by the threaded rod 21 of the fitting apparatus 20.

Preferentially, the pressure gauge 14 is a compact pressure gauge configured to measure a pressure ranging from 0 to 400 bars. For example purposes, the pressure gauge 14 is an electronic pressure gauge with digital display, for example an EDS3000 pressure gauge marketed by the HYDAC Company.

By measuring the pressure P by means of the pressure gauge 14, a measurement of the axial force Fa applied by the threaded rod 21 can then be deduced according to the dimensions of the piston 12, the hydraulic chamber 11 and the physical characteristics of the fluid 11'.

According to a preferential embodiment, the measuring device 10 comprises a display 15 connected to the pressure gauge 14. The display 15 is configured to transpose the pressure P measured by the pressure gauge 14 into an axial force value Fa applied by the threaded rod 21 on the connector 13.

The display 15 preferably comprises a computing unit and a screen. The computing unit processes the measurements collected by the pressure gauge 14 and calculates the corresponding axial force value. The screen can be a liquid crystal display (LCD), a diode screen, a needle screen or any other known display system, connected to the computing unit and preferentially configured to display the calculated value of the axial force.

According to an alternative, the display 15 is configured so as to provide a qualitative indication on the axial force measured by the pressure gauge 14. For example purposes, the display can comprise one or more indicator lights which are activated when the measured axial force is greater than a predefined threshold, or comprised within a predefined range. This type of display does not indicate a measured force value but a qualitative characterization of the measured force.

According to a preferential embodiment, the measuring device 10 comprises a rechargeable electric battery 18 configured to supply electric power to elements of the measuring device 10. In particular, the battery 18 can supply electric power to the pressure gauge 14 and display 15. For example purposes, the battery 18 can comprise a battery cell of a predefined voltage.

Conventionally, a fitting apparatus of an element to be crimped comprises an (internal or external) threaded rod, commonly called tie rod, designed to pull, screw and unscrew a first cooperative part of the element to be crimped. The fitting apparatus also comprises a counter-support configured to act as support of a second part of the element to be crimped. An axial movement between the rod and the counter-support results in an equivalent movement between the corresponding first and second parts of the element to be crimped, generating for example a crimping bead.

Thus, to simulate the crimping action of the fitting apparatus 20 as best as possible, the measuring device 10 advantageously comprises an anvil 17 designed to receive a counter-support 22 of the fitting apparatus 20.

The arrangement of the anvil 17 and of the tapped connector 13 is configured so as to secure the fitting apparatus 20 on the measuring device 10. Securing is achieved by screwing the threaded rod 21 of the fitting apparatus 20 onto the threaded connector 13 and by advantageously placing the counter-support 22 of the fitting apparatus 20 against the anvil 17, before applying a force on the piston, to prevent shocks between the anvil 17 and counter-support 22.

According to a preferential embodiment, the piston 12 and the hydraulic chamber 11 are configured in such a way that the piston 12 can have a travel along the longitudinal axis Ox of at least 0.2 mm. This minimal travel advantageously prevents any "shock" effect during measurement.

The transformation of an axial force into a hydraulic pressure, and the advantageous arrangements of the different elements of the device, in particular the piston and the hydraulic chamber, enable a faithful simulation of the crimping operation to be achieved when measurement of the axial force is performed. They further enable the "shock" effect occurring in an "indeformable" force cell such as a conventional piezoelectric cell to be circumvented.

Measurement of the axial force applied by a fitting apparatus with an enhanced precision is thus advantageously performed by the measuring device according to any one of the embodiments described in the foregoing. Furthermore, the measuring device 10 enables an immediate measurement to be made in a very short time, typically one second. Use of the latter therefore does not disturb efficient sequencing of the assembly operations, in particular on an assembly line.

Figure 5:
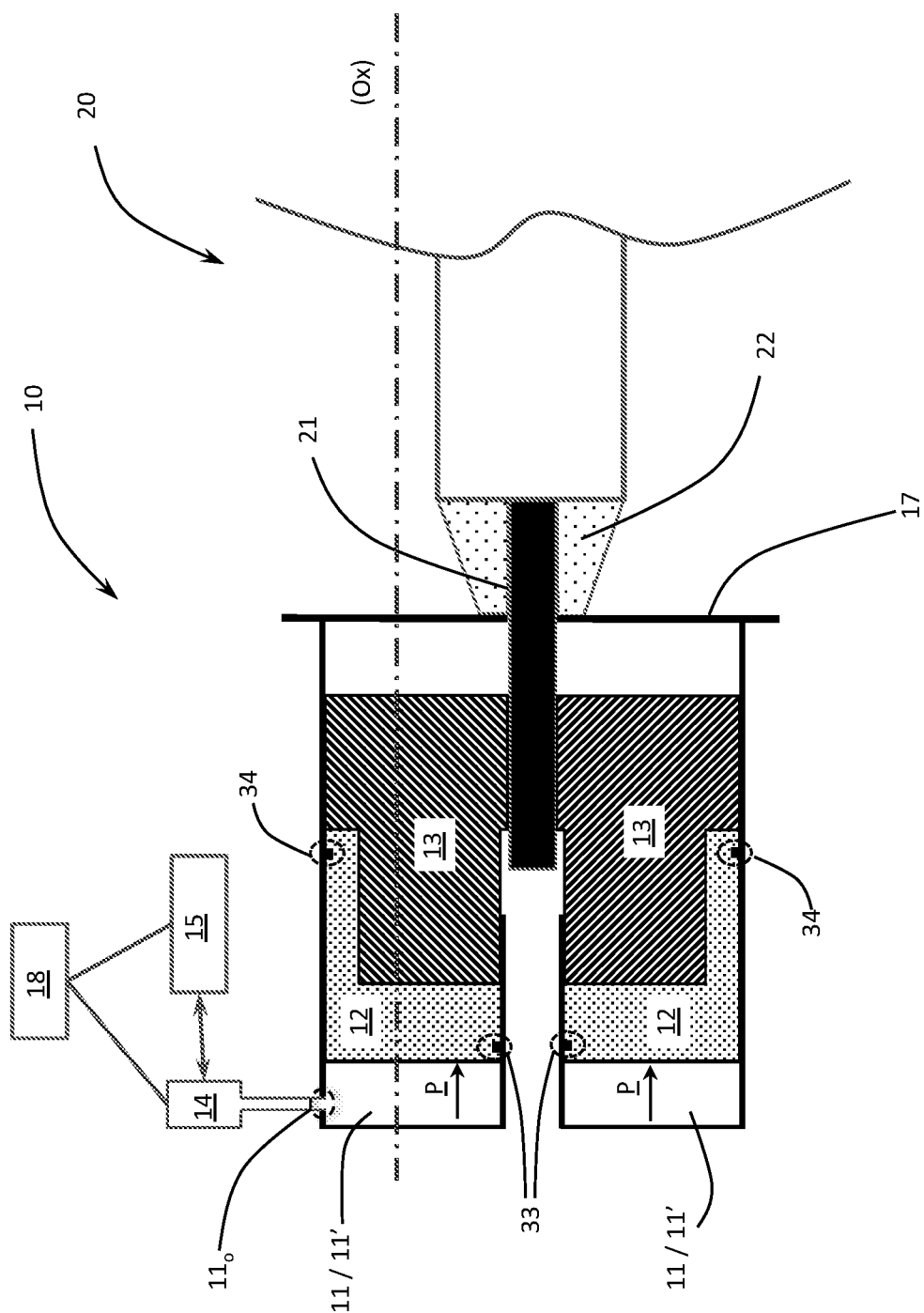
FIG. 5 represents another embodiment of the force measuring device, in schematic manner, in cross-sectional view.

According to another embodiment illustrated in FIG. 5, the piston 12 and hydraulic chamber 11 are arranged in such a way that the axial force Fa imposed on the piston 12 results in a negative pressure inside the hydraulic chamber 11, in other words a decrease of the pressure P in the hydraulic chamber 11, when the force measurement is performed. Under these conditions, the pressure gauge 14 is configured to measure a decrease of the pressure P in the hydraulic chamber 11. According to this embodiment, when the fitting apparatus 20 is secured on the measuring device 10, the piston 12 is located between the hydraulic chamber 11 and the fitting apparatus 20.

Furthermore, according to the embodiment illustrated in FIG. 1, when measurement of the force Fa applied by the rod 21 is performed, the piston 12 causes pressurization of the hydraulic chamber 11, in other words an increase of the pressure P inside the hydraulic chamber 11. When the fitting apparatus 20 is secured on the measuring device 10, according to the embodiment of FIG. 1, the hydraulic chamber 11 is located between the piston 12 and fitting apparatus 20.

Figure 6:
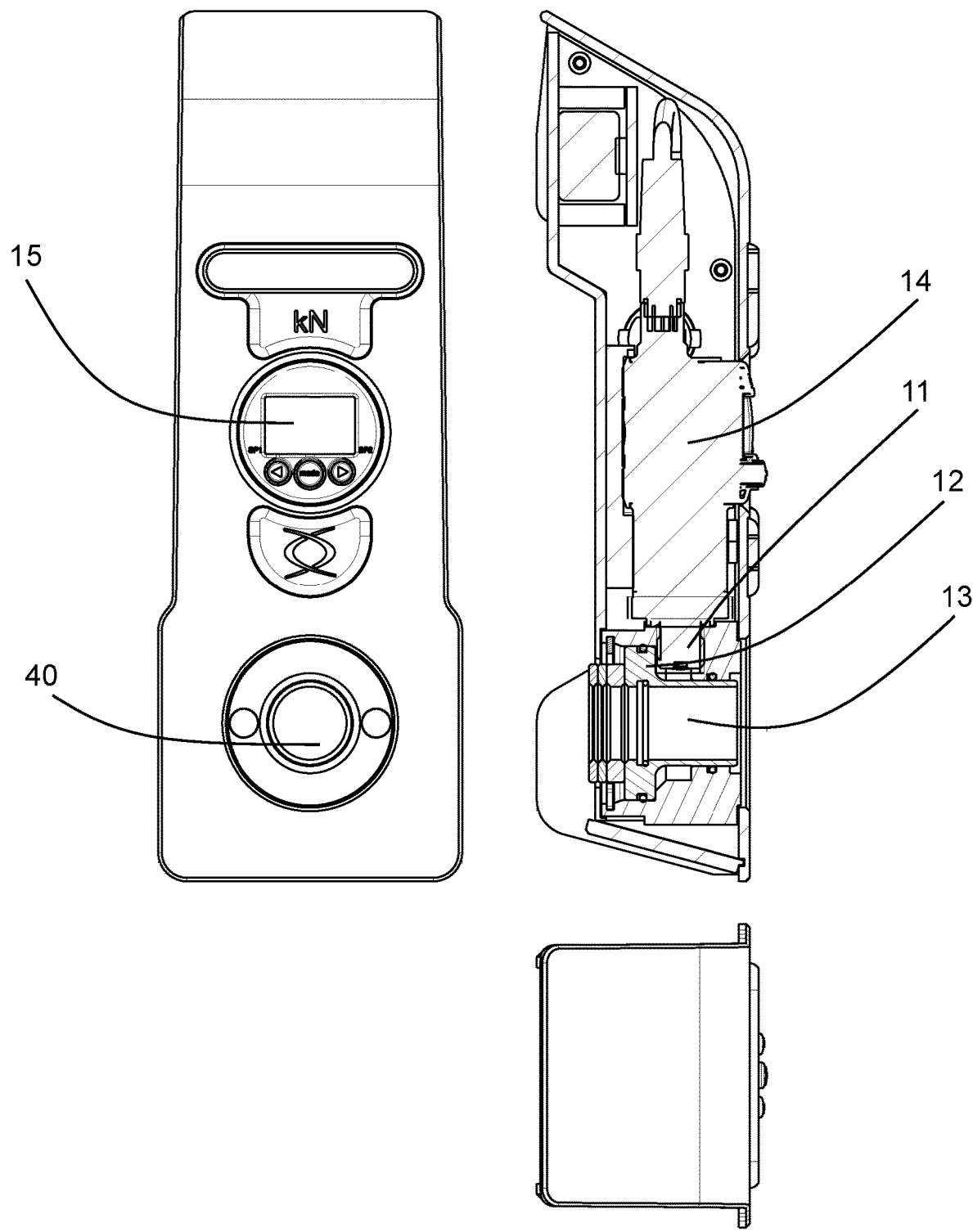
FIG. 6 represents an embodiment of the force measuring device, in normed view.

The use of a hydraulic chamber and the arrangements of the different elements of the device, in particular the piston and the hydraulic chamber, advantageously enable a force measuring device to be achieved that is compact, light and easy to produce. Indeed, the measuring device 10 provided and illustrated in FIG. 6, preferentially has dimensions in an orthonormal coordinates system that are respectively smaller than 244, 85 and 65 mm. The device is advantageously light and preferentially weighs less than 0.8 kg.

The force measuring device 10 is portable and can be held and handled with one hand. The measuring device is thus advantageously practical and easy to manipulate for an operator.

Furthermore, the force measuring device enables a force comprised between 3 kN and 40 kN to be measured, a measurement range covering most of the forces applied by a conventional portable crimper.

The invention claimed is:

1. A device for measuring a force applied by a fitting apparatus of an element to be crimped, said fitting apparatus being provided with a threaded rod having an internal or external thread, device comprising:
   a hydraulic chamber comprising a fluid and extending along a longitudinal axis;
   a piston configured to slide inside the hydraulic chamber along said longitudinal axis by an axial force imposed by the threaded rod on the piston;
   a threaded connector fixed to the piston, the threaded connector having an external or internal thread configured in such a way that the threaded rod screws onto the threaded connector so that the threaded rod can impose an axial force on the piston resulting in travel of the piston, along the longitudinal axis, inside the hydraulic chamber;
   a pressure gauge communicating with the hydraulic chamber and configured to measure a pressure inside the hydraulic chamber; and
   an anvil designed to receive a counter-support of the fitting apparatus so as to secure the fitting apparatus on the device by screwing the threaded rod onto the threaded connector and placing the counter-support against the anvil;
   the pressure gauge being configured so as to measure an increase of the pressure inside the hydraulic chamber when the threaded rod moves in the direction of the counter-support.

2. The device according to claim 1, comprising a display connected to the pressure gauge and configured to transpose the pressure measured by the pressure gauge into an axial force value.

3. The device according to claim 1, wherein the piston and the hydraulic chamber are configured in such a way that the piston can have a travel along the longitudinal axis of at least 0.2 mm.

4. The device according to claim 1, wherein the threaded connector is formed by a portion of the piston, the threaded connector and the piston forming a monoblock part.

5. The device according to claim 1, comprising a set of interchangeable parts, each part of the set being configured to form the threaded connector.

6. The device according to claim 5, wherein the set of interchangeable parts comprises parts designed to receive the threaded rod having a threading profile chosen from: a conifer profile, a square profile, a truncated profile, a conical profile, or an offset pitchs profile.

7. The device according to claim 1, comprising a rechargeable electric battery configured to supply electric power to elements of the measuring device.

* * * * *